United States Patent [19]
Geiling et al.

[11] Patent Number: 5,449,055
[45] Date of Patent: Sep. 12, 1995

[54] STOP VALVE DEVICE

[75] Inventors: Wolfgang Geiling, Schonungen-Hausen; Alfred Wirth, Schweinfurt, both of Germany

[73] Assignee: Fichtel & Sachs AG, Schweinfurt, Germany

[21] Appl. No.: 187,122

[22] Filed: Jan. 25, 1994

Related U.S. Application Data

[63] Continuation of Ser. No. 104,353, Aug. 9, 1993, abandoned, which is a continuation of Ser. No. 803,338, Dec. 4, 1991, abandoned.

[30] Foreign Application Priority Data

Dec. 8, 1990 [DE] Germany .......... 40 39 219.8
May 2, 1991 [DE] Germany .......... 41 14 305.1

[51] Int. Cl.⁶ .......... B60G 17/08; F16F 9/46; F16K 31/02
[52] U.S. Cl. .......... 188/299; 188/322.13
[58] Field of Search .......... 188/299, 322.13, 322.14, 188/322.15, 281, 282, 316, 317, 318, 319, 322.15, 315; 280/707, 714; 137/487.5; 251/129.01

[56] References Cited

U.S. PATENT DOCUMENTS

| | | | |
|---|---|---|---|
| 4,650,042 | 3/1987 | Knecht et al. | 188/299 |
| 4,838,394 | 6/1989 | Lemme et al. | 188/299 |
| 4,850,460 | 7/1989 | Knecht et al. | 188/299 |
| 4,880,086 | 11/1989 | Knecht et al. | 188/299 |
| 4,887,699 | 12/1989 | Ivers et al. | 188/378 |
| 4,936,425 | 6/1990 | Boone et al. | 188/299 |

FOREIGN PATENT DOCUMENTS

| | | |
|---|---|---|
| 0263346 | 4/1988 | European Pat. Off. |
| 0382479 | 8/1990 | European Pat. Off. |
| 0382480 | 8/1990 | European Pat. Off. |
| 2578617 | 9/1986 | France . |
| 3434877 | 4/1986 | Germany . |
| 9110077 | 7/1991 | WIPO . |

*Primary Examiner*—Douglas C. Butler
*Attorney, Agent, or Firm*—Brumbaugh, Graves, Donohue & Raymond

[57] ABSTRACT

A stop valve device (36) mounted in the by-pass (32, 36) of a vibration damper between a high pressure part section (32) and a low pressure part section (32a) has a stop valve (38) which can be moved by an external control (46) into an opening preparation state in which the actual opening can be brought about in dependence upon the pressure prevailing in the high pressure part section when the pressure falls below a predetermined value

28 Claims, 13 Drawing Sheets

STOP VALVE DEVICE

This application is a continuation of application Ser. No. 08/104,353, filed on Aug. 9, 1993 which was a continuation of application Ser. No. 07/803,338, filed on Dec. 4, 1991, both abandoned.

BACKGROUND OF THE INVENTION

The invention relates to a stop valve device between two part sections of a fluid connection which connects two fluid chambers of a vibration damper together, the stop valve device being constituted by at least one stop valve separating a high pressure part section and a low pressure part section, said stop valve being constituted by a stop valve body, and the stop valve body being adjustable by means of an external control between a shut-off position and an opening position.

Such stop valve devices are used in vibration dampers in a so-called by-pass duct which joins together two fluid chambers of the vibration damper. In the device the by-pass duct is divided by the stop valve into the low pressure part section and the high pressure part section. For example, such a by-pass duct may be found in twin-pipe vibration dampers between the fluid chamber through which the piston rod travels and the compensation chamber. In this case, on the opening of the stop valve, a flow through the by-pass duct takes place always in the same direction from the fluid chamber which receives the piston rod towards the compensation chamber, independently of the direction in which the piston rod may move relative to the cylinder. Through the shutting or the opening of the stop valve it is possible to alter the characteristic of the vibration damper. If the stop valve in the by-pass duct is open, the by-pass duct is switched substantially parallel with the piston valve arrangement, and the damping behaviour of the vibration damper is relatively mild. If the stop valve is closed, the damping characteristic of the vibration damper is essentially determined by the damping valve arrangement of the piston, and the damping behaviour of the vibration damper is relatively hard.

STATEMENT OF THE PRIOR ART

A vibration damper with a stop valve device of the constructional type first defined hereinabove is known, for example, from DE-PS 34 34 877.

It has now been found that in a vibration damper with by-pass duct between two fluid chambers and a stop valve device used for the alteration of the damping behaviour in this by-pass duct disturbing noises may arise when, on opening the stop valve in the fluid chamber situated at a higher pressure level, and therefore in the high pressure part section of the by-pass duct, an excessive momentary pressure prevails.

OBJECT OF THE INVENTION

The invention has for its object to design a stop valve device of the type defined hereinabove in such a manner that the opening of the stop valve takes place at a point in time when the pressure in the high pressure part sections lies below a predetermined value.

SUMMARY OF THE INVENTION

A stop valve device is proposed between two part sections of a fluid connection, which joins together two fluid chambers of a vibration damper. The stop valve device is formed with at least one stop valve separating a high pressure part section and a low pressure part section and is provided with a stop valve body. This stop valve body is adjustable by an external control between a stop position and an opening position. The stop valve may be, by the external control, transferable into an opening preparation state. In this opening preparation state, the opening may be brought about in dependence upon the pressure prevailing in the high pressure part section, if the pressure falls below a predetermined value. As in a vibration damper, in the course of the periodical vibrations of the piston rod relative to the cylinder, the pressure in the fluid chambers changes periodically and therefore within a short period, it is to be taken into account that after the stop valve body has gone over to the opening preparation state within a very short time there arises the pressure condition which is the prerequisite for bringing about the opening of the stop valve in desired manner. As the pressure in the high pressure part section is then below the predetermined pressure, no pressure release leading to noise is to be expected.

The concept of the invention may be utilized independently of whether the stop valve body is adjustable directly by means of the external control, as is for example the case in DE-PS 34 34 877, or whether the external control actuates a pilot valve which, for its part, influences the pressure in a control chamber impinging the stop valve body.

In addition, the stop valve device constructed according to the invention may be used both in single tube vibration dampers and in twin-tubes vibration dampers.

Preferably the stop valve device of the invention is designed according to the pilot control principle in that a first side of the stop valve body impinged by the high pressure part section can be pressed elastically against a stop valve body, in that, furthermore, a second side of the stop valve body spaced from this first side, and adjoining a control chamber, can be impinged by the fluid pressure in this control chamber, in that, furthermore, the control chamber is connected by means of a throttling section extending across the stop valve body with the high pressure part section, in that, furthermore, the control chamber is in connection with the low pressure part section via a control chamber outflow, in that this control chamber outflow can be moved by the external control into an outflow preparation state, and in that the control chamber outflow in the outflow preparation state is openable depending upon the pressure prevailing in the high pressure part section when the pressure in the high pressure part section falls below the predetermined value.

In the arrangement described there can be provided in the control chamber outflow a control chamber outflow valve with a control chamber outflow valve seat and a control chamber outflow valve body elastically biased towards an outflow position which, by means of the pressure prevailing in the control chamber and by means of an additional closing force dependent on the external control, can be impinged in the direction of a closing position, the outflow preparation state being achievable by switching off the additional closing force dependent upon the external control. For example, a magnet armature can act upon the control chamber outflow valve body, this armature transferring the additional closing force onto the control chamber outflow valve body, substantially in such a manner that the armature is loaded by a magnet armature tensioning spring so as to produce the additional closing force, and that, to eliminate the additional closing force a magnet coil of the armature is charged with current.

In a first embodiment of the invention it is provided that the control chamber outflow valve body is formed by a disc spring which is tensioned by the inner tension in the direction of an opening of the control chamber outflow, and at the same time is exposed to the pressure prevailing in the control chamber and to the action of the armature.

In this arrangement the disc spring can lie with a first circumferential edge on a support shoulder of an intermediate body unit, and with a second circumferential edge it can he pressed against the control chamber outflow valve seat. Alternatively, the disc spring can also he clamped with the first circumferential edge on the intermediate body unit. However, preference is given to the form of construction whereby the disc spring lies against the support shoulder, as, with this embodiment, smaller material stresses arise.

In order, with small externally introduced control forces, to achieve short switching periods, it is proposed to mount the control chamber outflow valve body on an intermediate body unit which, by means of the pressure in the control chamber, can be sealingly applied against the stop valve body, and when the pressure drops in the control chamber, can be lifted from the stop valve body, forming an additional control chamber outflow from the control chamber.

In this arrangement the intermediate body unit can be sealingly guided in a part of a stop valve housing. However, it is preferably provided that the intermediate body unit should be sealingly guided in an armature. This embodiment has the advantage that the magnetic field of the coil impinging the armature is exposed to a smaller extent to the danger of a disturbance by ferritic constructional parts, such as, possibly, the disc spring.

The intermediate body unit may be formed from a supporting part supporting the control chamber outflow valve body, and an additional outflow valve body in ball-joint engagement with the support part, this additional outflow valve body constituting together with an additional outflow valve seat formed on the stop valve body the additional control chamber outflow of the control chamber. In this way, the balljoint engagement between the support part and the additional outflow valve body affords the advantage that the seal of the additional control chamber outflow is less impaired by alignment errors during processing.

In a second embodiment of the invention it is provided that the control valve outflow valve seat is formed on an additional outflow valve body which, together with an additional outflow valve seat, forms an additional control chamber outflow of the control chamber, and that, between the control chamber outflow valve body and the additional outflow valve body a helical pressure spring is arranged, tensioning the control chamber outflow valve body in the direction of lift from the control chamber outflow valve seat of the additional outflow valve body. This embodiment has the advantage of more restricted material stresses.

With this arrangement the control chamber outflow valve body can be sealingly guided in a valve body guide of a stop valve housing. However, it is preferred that the control chamber outflow valve body should be sealingly guided in a valve body guide of a magnet armature. This affords the advantage that the magnetic field of the coil impinging the armature is exposed to a lesser degree to the danger of disturbance by ferritic constructional parts. Additionally, it is proposed that the control chamber outflow valve body and the additional outflow valve body should adjoin each other in ball jointed manner in the region of the control chamber outflow valve seat. In this way errors of alignment in processing can be compensated in simple manner, so that the seal of the additional control chamber outflow valve can be ensured.

In a further embodiment of the invention it is provided that the control chamber outflow valve seat should be formed on the stop valve body, and that, between the control chamber outflow valve body and the stop valve body a helical pressure spring is provided which tensions the control chamber outflow valve body in the direction of the lifting from the control chamber outflow valve seat of the stop valve body. In this form of embodiment the number of constructing parts is reduced, as a result of which a simpler manufacture of the stop valve device is made possible.

In a further formation of this form of embodiment it is proposed that the control chamber outflow valve body should be sealingly guided able to wobble, or in ball jointed manner in a valve body guide of a stop valve housing or of a magnet armature. In this arrangement the preference is given to the guiding of the control chamber outflow valve body in a valve body guide of a magnet armature on account of a reduced proneness to disturbance of the stop valve device from ferritic parts. As a result of the guiding, able to wobble or ball-jointed, alignment defects occurring in manufacture can be compensated.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which.

DETAILED DESCRIPTION OF THE PREFERRED EMBODIMENTS

Figure 1:
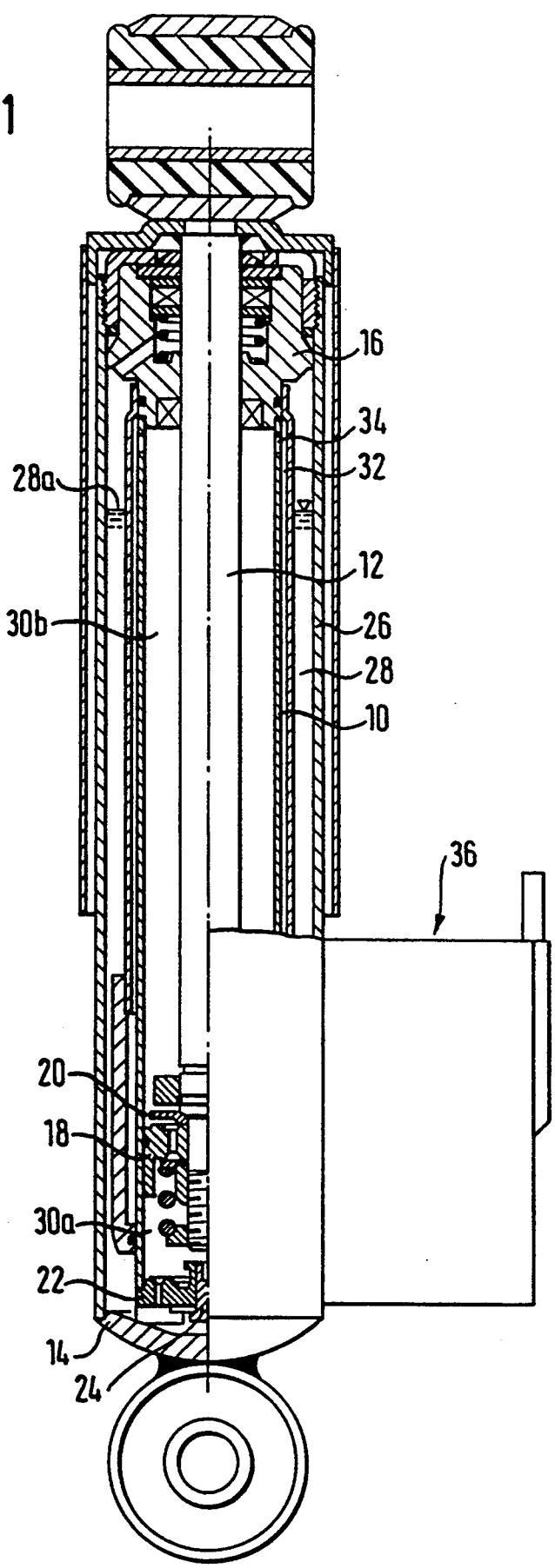
FIG. 1 is a vibration damper with by-pass and stop valve in the by-pass.

In FIG. 1 the cylinder of a vibration damper is denoted by 10, the piston rod by 12. The cylinder is closed off downwards by a bottom 14. The piston rod 12 is guided out of the upper end of the cylinder by a guide and sealing unit 16. Secured inside the cylinder 10 on the piston rod 12 is a piston unit 18 with a piston valve arrangement 20. The bottom end of the cylinder is closed off by a bottom plate 22 with a bottom valve arrangement 24. The cylinder 10 is encompassed by a container tube 26. Between the container tube 16 and the cylinder 10 an annular space 28 is formed which constitutes a compensation chamber. The space inside the cylinder 10 is divided by the piston unit 18 into a first working chamber 30a and a second working chamber 30b. The working chambers 30a and 30b are filled with pressure liquid. The compensation chamber 28 is filled up to level 28a with liquid, and above it with gas. Formed inside the compensation chamber 28 is a first ducting path, namely a high pressure part section 32, which connects by means of a hole 34 of the cylinder with the second working chamber 30b. Connecting with this high pressure part section is a stop valve device 36 mounted laterally on the container tube 26. From the latter, a second ducting path (not shown), namely a low pressure part section, leads to the compensation chamber 28.

Figure 2:
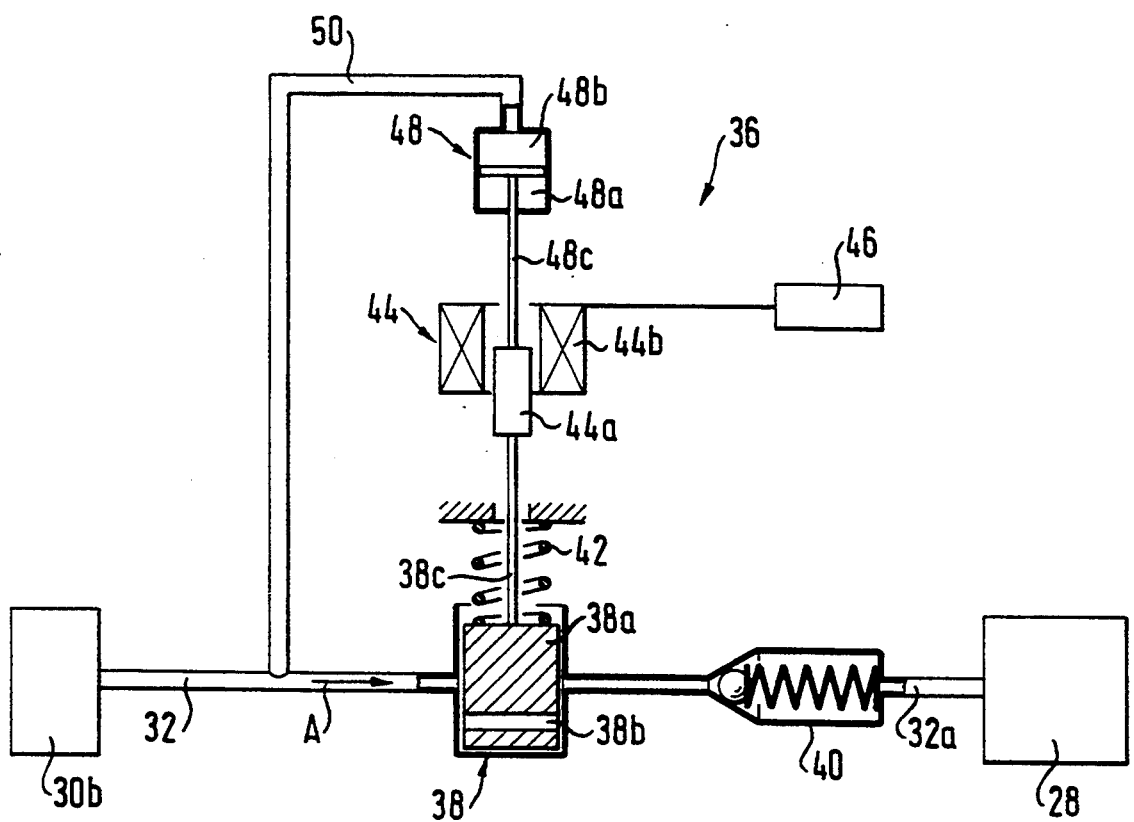
FIG. 2 is a diagrammatic representation to explain the modus operandi of the stop valve device of the invention.

When the piston rod 12 is extended upwards out of the cylinder 10 the size of the upper working chamber 30b is reduced. In the upper working chamber 30b an excess pressure is created which can he reduced through the piston valve arrangement 20 into the lower working chamber 30a, as long as the stop valve device 36 is closed. When the stop valve arrangement 36 is open, liquid flows simultaneously from the upper working chamber 30b through the high pressure part section 32 and the stop valve device 36 into the compensation chamber 28. The damping characteristic of the vibration damper on the extension of the piston rod is therefore dependent upon the fact whether the stop valve device 36 is open or closed. When the piston rod 12 is retracted into the cylinder 10 an excess pressure is created in the lower working chamber 30a. Liquid can pass from the lower working chamber 30a through the piston valve arrangement 20 upwards into the upper working chamber 30b. The liquid displaced by the increasing piston rod volume inside the cylinder is expelled by the bottom valve arrangement 24 into the compensation chamber 28. A rising pressure also prevails in the upper working chamber 30b, as the throughflow resistance of the piston valve arrangement 20 is smaller than the throughflow resistance of the bottom valve arrangement 24. This increased pressure, when the stop valve arrangement 36 is opened, can overflow along the high pressure part section 32 again into the compensation chamber 28. This means that when the stop valve device 36 is open the shock absorber, also on retraction, the has a milder characteristic when the stop valve device 36 is open, and a harder characteristic when the stop valve device is closed, in precisely the same manner as on the extension of the piston rod. It will be observed that the direction of flow through the high pressure part section 32 of the by-pass is always the same irrespective of whether the piston rod is extended or retracted. The stop valve device 36 diagrammatically shown in FIG. 2 is situated in a by-pass between the upper working chamber 30b and the compensation chamber 28 and essentially consists in a stop valve 38 and a valve 40 opening depending on pressure, which are mounted in series in the direction of flow A. In this arrangement, the pressure-dependent opening valve 40, because of its design and the spring force, is jointly responsible for the characteristic of the vibration damper when the stop valve 38 is open. The stop valve 38 comprises a piston 38a which is provided with a hole 38b and is adjustable between a passage position and a stopping position (cf. FIG. 2). The piston 38a is pretensioned by a pressure spring 42 into its closing position. Furthermore, the piston 38a is connected by means of a piston rod 38c with an armature 44a of an electromagnet 44. A current flowing through the windings 44b of the electromagnet 44 can, depending on signals originating from an external source of signals 46, be switched on or off. When the current is on, there is created in the windings 44b a magnetic field which influences the armature 44a in that the armature 44a exerts a force directed towards passage position on the piston 38a connected with it by means of the piston rod 36. On the side of the armature 44a facing the piston rod 38c a piston rod 48c of a hydraulic device 48 is mounted. The hydraulic device 48 comprises a piston 48a which is impinged by the pressure in a chamber 48b shown in FIG. 2 above the piston 48a. The upper chamber 48b of the hydraulic device 48 is connected by means of a secondary duct 50 with the high pressure part section 32. The pressure prevailing in the upper chamber 48b against the piston 48a exerts, by means of the piston reds 48c and 38c as well as the armature 44a, onto the piston 38a a force to the effect that the latter is moved into its closing position. When no current is flowing through the magnet coil 44b, the spring force of the pressure spring 42 and the hydraulic force originating from the pressure in the upper chamber 48b of the hydraulic device 48 act upon the piston 38a. Both forces act in the direction of the closed position of the piston 38a. If, now, the magnet coil 44b, further to an external signal, has current flowing through it, the magnetic force transmitted over the armature 44a and the piston rod 38c on the piston 38a, will act against both these forces. If the pressure P prevailing in the high pressure part section 32 and therefore also in the upper chamber 48b is in excess of a predetermined limit pressure $P_G$, the sum of the amounts of the hydraulic force resulting from this and of the spring force originating from the spring 42, will be greater than the amount of the magnetic force. Correspondingly, there results an overall force directed in the direction of a closing position of the piston 38a. If the pressure P prevailing in the high pressure part section P falls below the predetermined value $P_G$, there results a correspondingly lower hydraulic force. The sums of the amounts of the hydraulic force and of the spring force is now smaller than the magnetic force, so that an overall force results which impels the piston 38a out of its closing position into its passage position. Provision is made that after the opening of the stop valve has taken place this remains open as long as current flows through the coil 44b, even if the pressure again rises in the high pressure part section 32 and therefore the hydraulic force exerted by the hydraulic device 48 again rises. This may be achieved, for example, in that, through the corresponding designing of the coil 44b and of the armature 44a, the magnetic force in the opening position of the top valve (i.e. when the armature 44a has fully entered the coil 44b) is greater than in the closing position shown in FIG. 2, and in fact so great that, for all the pressures to be expected in the high pressure part section 32, the stop valve remains in the open position as long as only the coil 44b has current flowing through it. If, subsequently, the current creating the magnetic field of the electromagnet is again switched off, one has again only the spring force originating from the spring 42 and the hydraulic force originating from the pressure in the upper space 48b of the hydraulic device 48, which forces cooperate independently of the value of the prevailing pressure P, in order to transfer the piston 38a to its closing position. Through an appropriate dimensioning of the hydraulic device 48, of the electromagnet 44 and of the pressure spring 42 a desired limit pressure $P_G$ can be predetermined.

In FIGS. 3 to 6 there may be seen in section the cylinder 10, the high pressure part section 32 of the by-pass and the compensation chamber 28. Connecting with the high pressure part section 32 is a central channel 52 which belongs to the stop valve device 36. In the upper end of the central channel 52 a stop valve seat 54 is provided. A rigid stop valve plate 56 lies as a stop valve body on the stop valve seat 54. In FIGS. 3 to 6 the stop valve plate is situated in its closing position, and the connection between the central channel 52 and the compensation chamber 28 through holes 58 is substantially closed. The stop valve plate 56 is tensioned by means of a helical pressure spring 60 in the direction of the stop valve seat 54 which acts on a plate 62.

In the stop valve device 36 an armature 64 is arranged concentrically with the central channel 52. This armature is tensioned by means of an armature tensioning spring 66 in FIGS. 3 to 6 downwards in the direction of the stop valve plate 56 and can be pulled upwards by a magnet winding 68, when this magnet winding 68 has current passing through it. Mounted between the armature 64 and the stop valve plate 56 is an intermediate body unit 70, 72. The intermediate body unit comprises a support part 70 and an additional outflow valve unit 72 shown in FIGS. 3 to 6 to be arranged below the support part, which is taken up in a recess 70a of the support part 70 and is bell-shaped. The support part 70 supports a disc spring 74 which, by means of an inner peripheral edge 74a, is mounted into an annular groove 70b formed on the support part and can be pressed at an external peripheral edge 74b, by means of an annular rib 64a formed on the armature 64, onto a control chamber outflow valve seat 70c formed on the support part to close control chamber outflow holes 70f in the support part 70. The disc spring constituting the control chamber outflow valve body 74 is, through its inner tensioning, elastically tensioned in the direction of the opening of the control chamber outflow, i.e. in the sense of a rise from the control chamber outflow valve seat 70c. The additional outflow valve body 72, in the state illustrated in FIGS. 3 to 5, lies with an edge flange 72a on an annular rib 56a of the stop valve plate 56 and forms with this an additional outflow valve. A pressure spring 75 tensions the additional outflow valve 72a, 56a in the direction of its opening. Furthermore, the additional outflow valve body 72 lies in an annular zone 72b with a spherical surface substantially sealingly to a cone 70d of the recess 70a. The engagement of the annular zone 72b and of the cone 70d is supported by the force of the spring 75. A hole 72o of the additional outflow valve body passes through the crown area of the latter and connects with a through hole 70e of the support part 70 which opens out into a chamber 76 formed substantially disc-shaped. The space 76 is defined on the one hand by the armature 64, and on the other hand by the control chamber outflow valve body 74 and the support part 70. A through hole 64b of the magnet armature 64 connects one spring chamber 64c receiving the magnet armature tensioning spring 66 with the space 76. A space 78 formed between the additional outflow valve body 72 and the stop valve plate 56, the holes 72c of the additional outflow valve body 72 and 70e of the support part 70, the disc-shaped space 76, the hole 64b of the armature 64, the spring chamber 64c and the space situated above the armature constitute together a control chamber 80.

Figure 3:
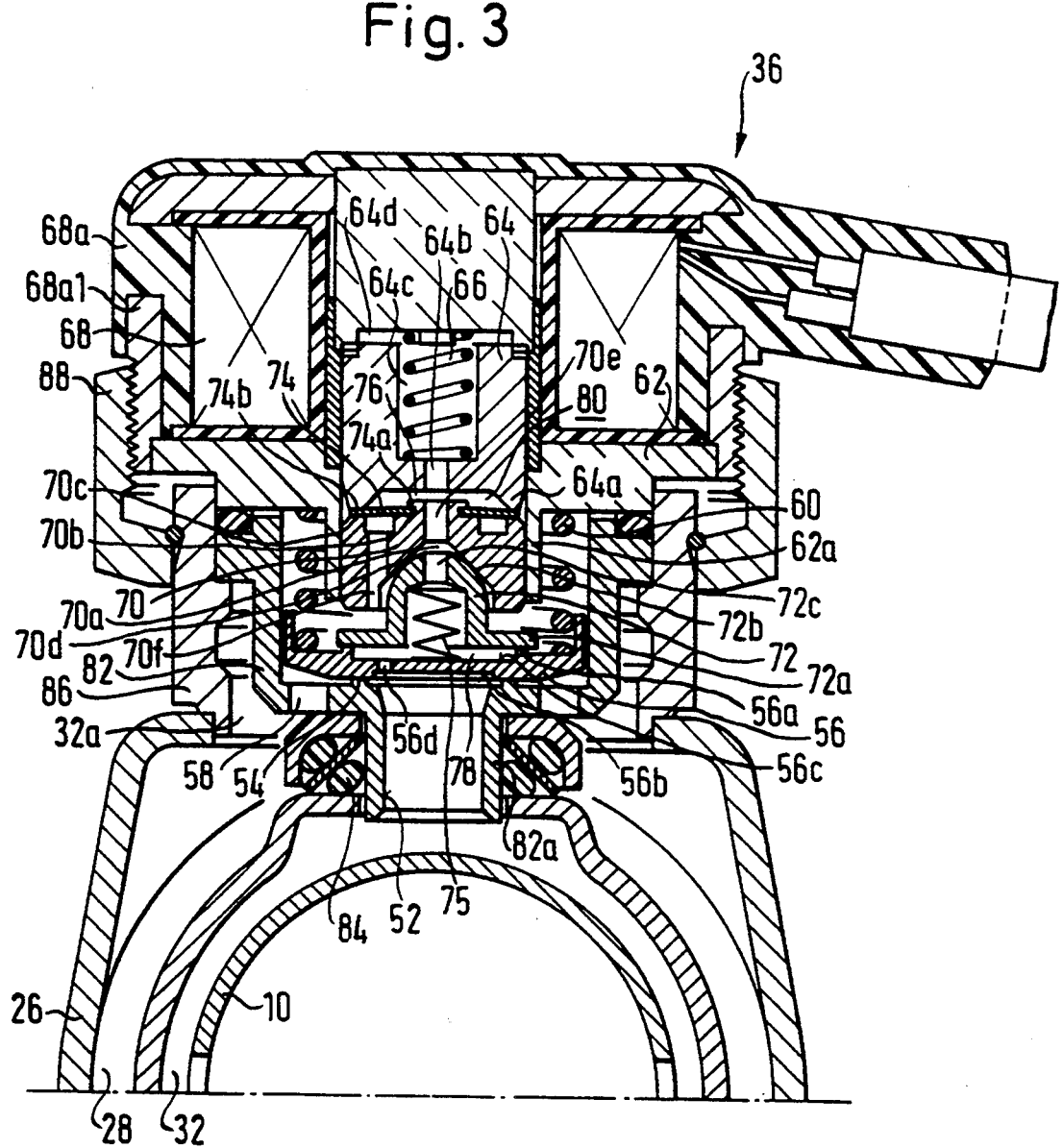
FIGS. 3, 4, 5 and 6 show a first embodiment of the stop valve device for a diversity of control signals and pressure conditions.

The underside of the stop valve plate 56 is denoted by 56b, the upper side by 56c. The stop valve plate 56, in the state shown in FIG. 3, is exposed from below to the pressure P in the central channel 52, i.e. to the pressure in the upper working chamber 30b according to FIG. 1 and the high pressure part section 32. When the control chamber outflow valve 74, 70c is closed, the upper side 56c is exposed to the pressure in the control chamber 80. The pressure in the central channel 52 is imparted to the control chamber 80 via a throttle hole 56d which passes through the stop valve plate 56. The pressure prevailing in the control chamber 80 impinges the control chamber outflow valve body 74 in the direction of the closing of the control chamber outflow valve 74, 70c. In this particular case the pressure in the control chamber 80 is substantially equal to the pressure in the central channel 52, as the control chamber outflow valve 74, 70, the additional outflow valve 72a, 56a and also the outflow possibility between the spherical surface 72b and the cone 70d are shut off.

The stop valve plate 56 is housed in a bowl-shaped insert 82 which has the hole 58 and, downwards, a pipe socket 82a. This pipe socket forms the central channel 52 and is sealingly connected by means of a seal 84 with the first part section 32 of the by-pass. The bowl 82 is set in a pipe socket 86 which is welded with the container 26. The intermediate space between the bowl 82 and the pipe socket 86 forms a low pressure part section 32a of the by-pass. The high pressure part section 32 and the low pressure part section 32a form together the by-pass. Mounted on the bowl 82 is the intermediate plate 62 which, together with the iron parts and housing parts belonging to the magnet winding 68, can form a constructional unit.

It is also possible to mount all parts of the magnet valve unit one after the other on the branch pipe 86 and finally to connect this pipe 86 by means of an union nut 88 with the magnet winding housing 68 or a threaded insert 68a1 of the magnet winding housing.

Let it be now assumed that the magnet winding 68 has no current flowing through it, so that the armature 64 according to FIG. 3, by the action of the magnet armature tensioning spring 66, is tensioned downwards against the control chamber outflow valve body 74, and thus also the support part 70, the support part 70 lies on the annular zone 72b, the additional outflow valve body 72 lies on the annular rib 56a and the stop valve plate 56 lies on the valve seat 54. The control chamber outflow valve 74, 70c is closed in this position, so that in the control chamber 80 there prevails substantially the same pressure as in the high pressure part section 32. Also the stop valve 56, 54 is, according to FIG. 3, in its closing position: firstly, the upper side 56c of the stop valve body 56 exposed to the pressure in the control chamber 80 has a greater surface than the underside 56b exposed to the pressure in the central channel 52, from which there results a force which acts in the direction towards the closing position of the stop valve 56, 54; secondly, the force which the helical pressure spring 60 exerts on the stop valve body 56 is directed towards the closing position of the stop valve and, thirdly, the force of the armature tensioning spring 66, as described above, is transmitted via the intermediate body unit 70, 72 onto the stop valve body 56 and effects a closing of the stop valve. Naturally, in the arrangement illustrated in FIG.

3, leakage currents are not to be ruled out. The starting point may just as well be that, for a correspondingly great dimensioning of the throttle hole 56d, the pressure in the control chamber 80, in the position shown in FIG. 3, is always substantially the same as the pressure in the central channel 52. In this connection it is not to be ruled out either that, e.g., in the control chamber outflow valve body 74, a pre-opening passage could be provided with permits constantly a pre-opening flow, the throttle hole 56d being then dimensioned correspondingly greater, so as to maintain in the control chamber 80 a pressure adequate for the closing of the stop valve 54, 56.

Figure 4:
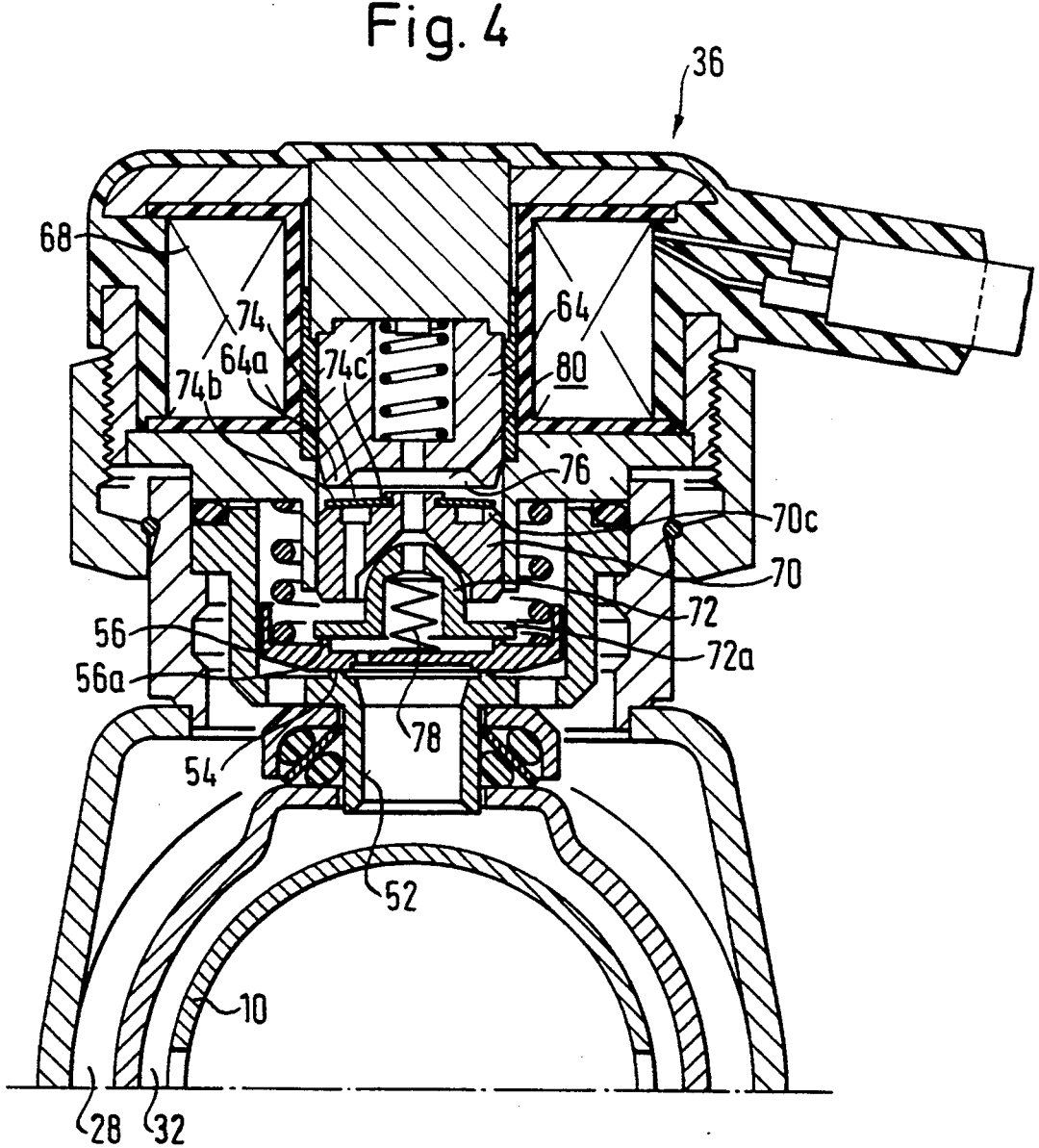
Figure 5:
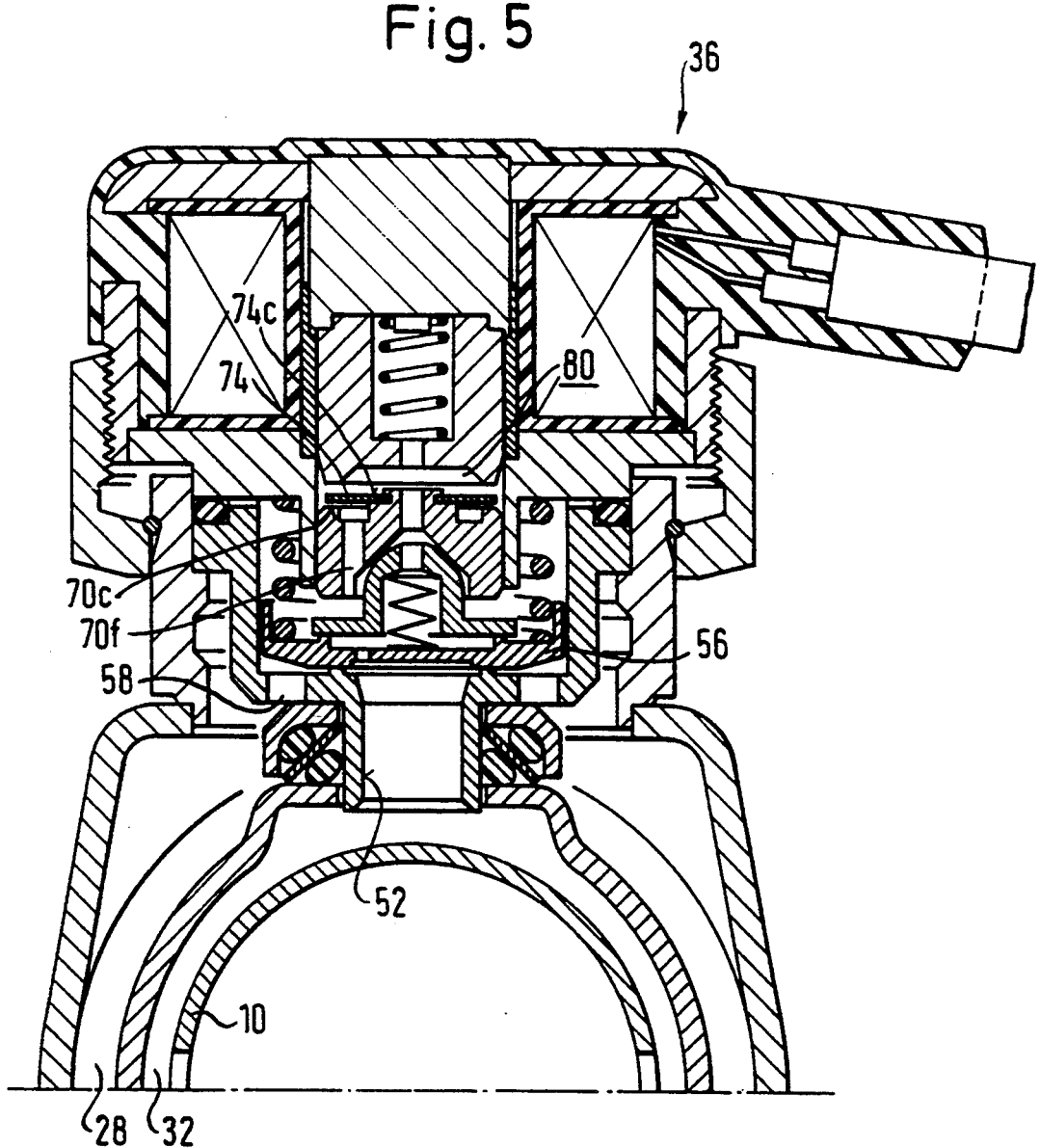

If the magnet winding 68 is excited, the armature 64 will be attracted, as shown in FIG. 4, so that the outside edge 74b of the control chamber outflow valve body 74 is no longer in engagement with the annular rib 64a of the magnet armature. If the force exerted by the pressure P prevailing in the control chamber 80 onto the upper side 74c of the control chamber outflow valve body 74 greater than the elastic inner tensioning force of the disc spring 74, the control chamber outflow valve 74, 70c continues to be closed; it is situated in its outflow preparation state. As the intermediate body unit 70, 72 and the disc spring 74 afford together to the pressure prevailing in the control chamber, in the region of the disc space 76, a greater surface for impingement than in the region of the space 78, the result is, on the one hand, that the support part 70 and the additional outflow valve body 72 are held together more securely, and, on the other hand, that the intermediate body unit 70, 72 is held more securely with the edge flange 72a of the additional outflow valve body 72 on the annular rib 56a of the stop valve body 56. Consequently, no fluid can yet escape towards the low pressure side, i.e. towards the compensation chamber 28. Therefore, the pressure in the control chamber 80, in the position shown in FIG. 4, continues substantially to be the same as in the high pressure part section 32 or in the central channel 52. The stop valve 56, 54 continues to be closed also after the removal of the force originating from the armature tensioning spring 64 for the reasons explained in connection with FIG. 3.

If the pressure P prevailing in the central channel 52 and therefore in the control chamber 80, when current continues to flow through the magnet winding 68, falls below a limit value $P_G$, the force exerted by the pressure P on the upper side 74c of the control chamber outflow valve body 74 is smaller than the elastic inner tensioning force of the disc spring 74. The disc spring 74 can now release, so that the control chamber outflow valve 74, 70c according to FIG. 5 opens. Now, the damping fluid can flow out of the control chamber 80 through the control chamber outflow holes 70f and the holes 58 into the compensation chamber 28. As a result the pressure in the control chamber 80 collapses. The intermediate body unit 70, 72, according to FIG. 6, is raised from the stop valve body 56 by the force of the spring 75, so that also the additional outflow valve 72a, 56a opens, and between the edge flange 72a of the additional outflow valve body 72 and the annular rib 56a of the stop valve body, an additional outflow possibility is created for damping liquid out of the control chamber 80 towards the compensation chamber 28.

Figure 6:
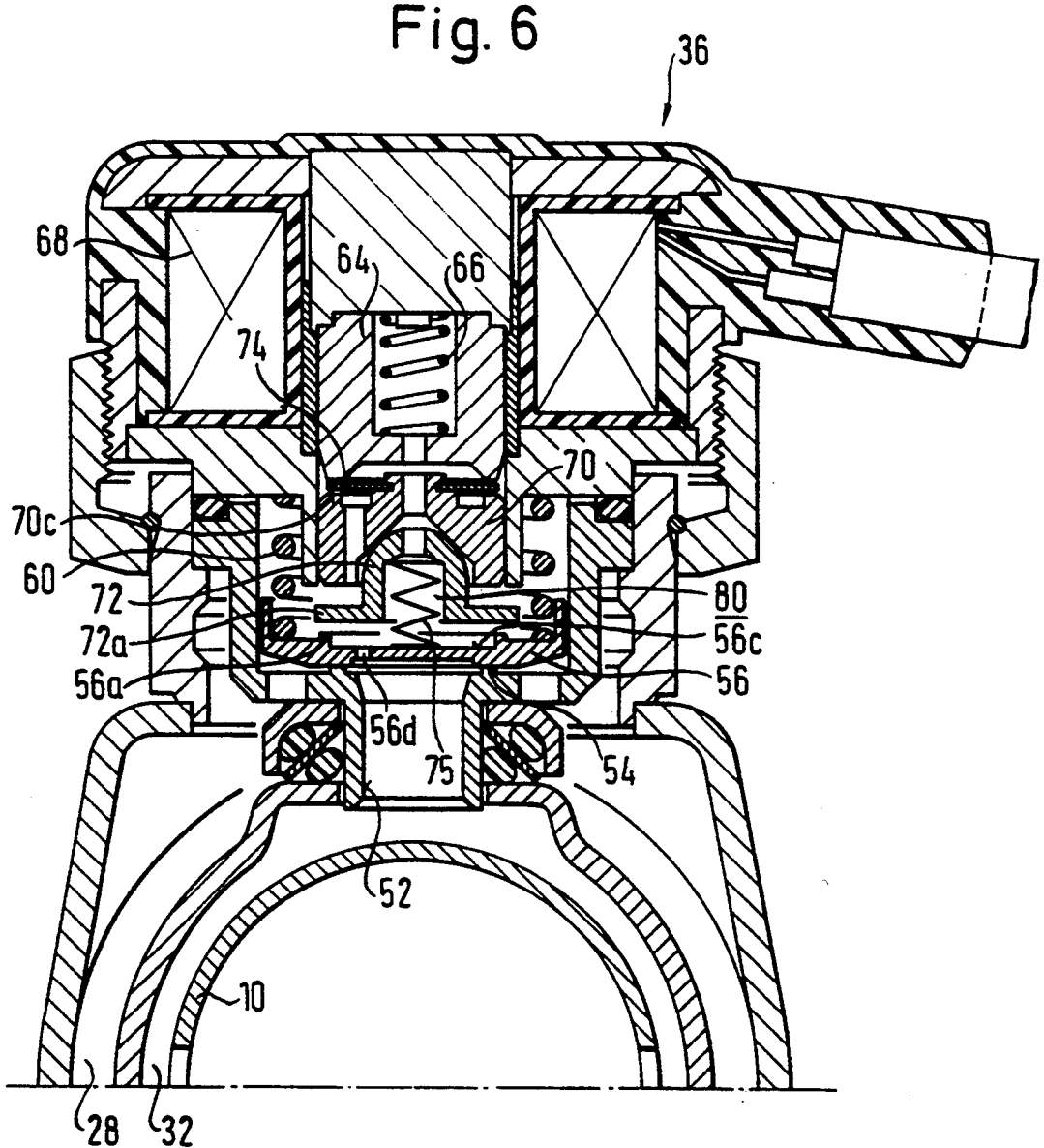

In the position according to FIG. 6, the stop valve 56, 54 operates as a normal pressure-dependent valve with a throttle hole 56d through which a smaller liquid stream can flow from the central channel 52 into the compensation chamber 28. As the supply of liquid increases in the central channel 52, i.e. on the acceleration of the stroke of the piston 12 against the cylinder 10 (FIG. 1), the stop valve plate 56 increasingly rises from the valve seat 54 against the force of the spring 60. The main stream in this case flows through between the valve seat 54 and the stop valve plate 56, while a smaller partial stream flows through the throttle hole 56d and the control chamber 80 towards the compensation chamber 28.

It should be noted that when the control chamber outflow valve 74, 70c is first opened and the intermediate body unit 70, 72 is raised from the stop valve plate 56, the pressure P prevailing in the central channel 52 against the stop valve plate 56 can again exceed the limit pressure $P_G$ also without the control chamber outflow valve closing again or the intermediate body unit 70, 72 applying again on the annular rib 56a.

If a closing instruction is emitted from the external source of signals, and as a result no current flows any more through the magnet coil 68, the armature 64, as a result of the force of the armature tensioning spring 66, will close the control chamber outflow valve 74, 70c and press the intermediate body unit 70, 72 again against the annular rib 56a of the stop valve body 56, as a result of which also the additional control chamber outflow between the edge flange 72a and the annular rib 56a will close. Pressure again accumulates in the control chamber 80, and impinges the upper side 56c of the stop valve plate 56. The force resulting from this cooperates with the force of the pressure springs 60 and 66 in order to press the stop valve plate 56, against the dynamic pressure of the damper liquid in the central channel 52, again against the valve seat 54. The stop valve device 36 is now again in its position according to FIG. 3.

It should be added that the intermediate body unit 70, 72 may also be designed as one piece. The advantage of a two-piece construction with ball-joint connection of the two parts, however, is that any alignment defects present could be compensated in simple manner.

Figure 7:
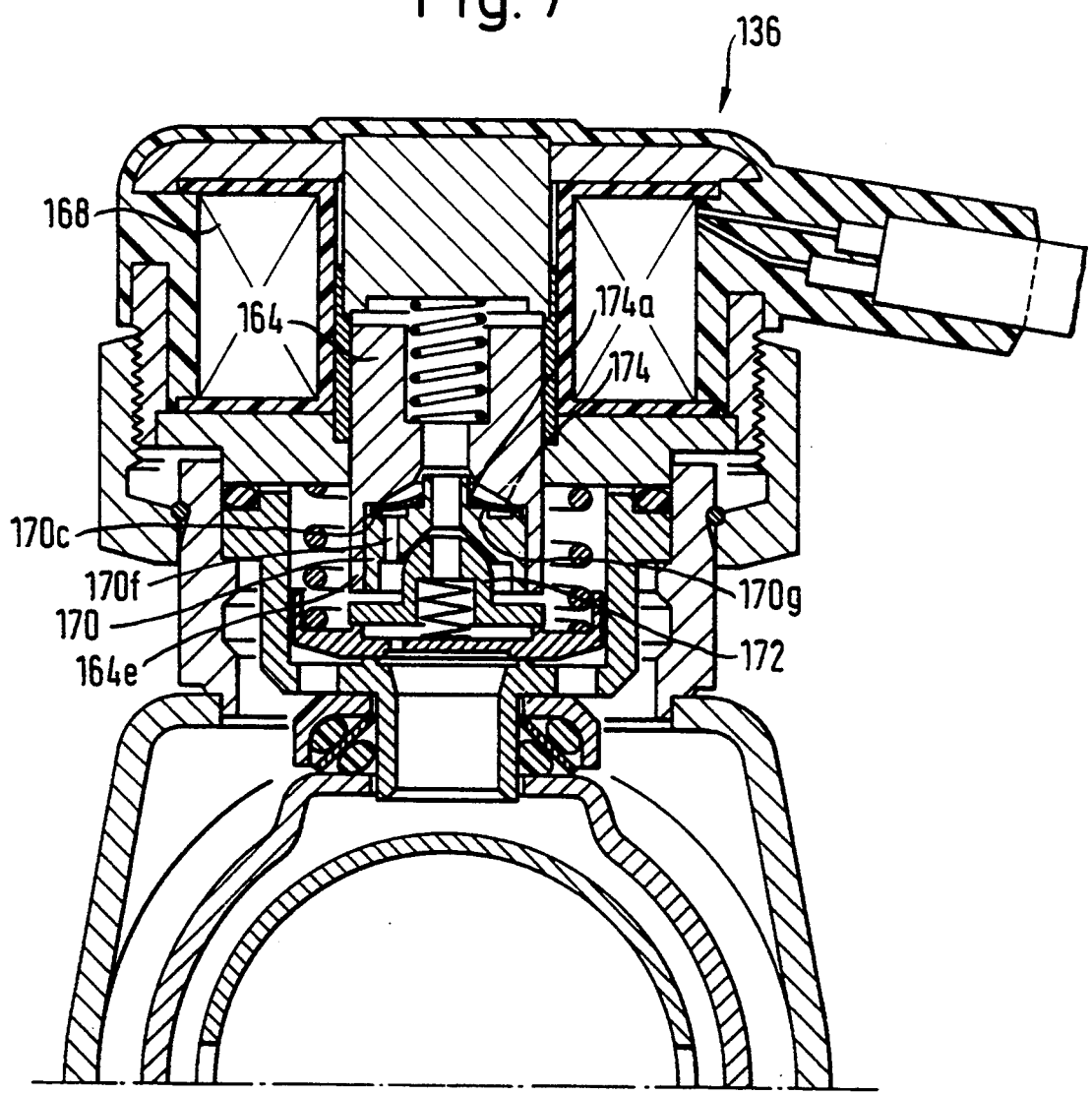
FIG. 7 is a second embodiment of the stop valve device in stopping position.
Figure 8:
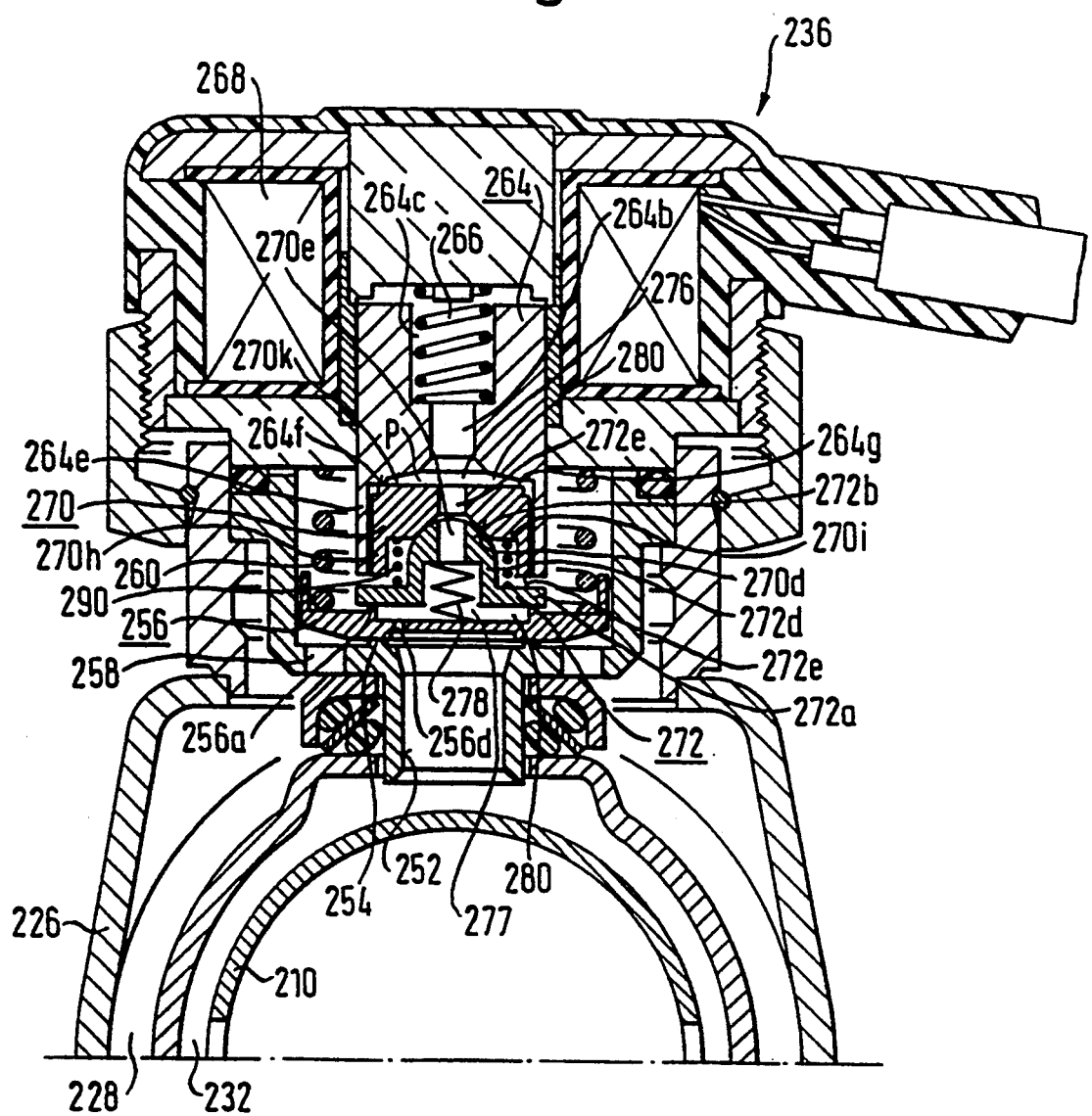
FIGS. 8, 9, 10, 11, and 12 are further embodiments of the stop valve device.

In FIG. 7 a representation is given of a second embodiment of the stop valve device. Similar parts are given the same reference numbers as in FIGS. 3 to 6, increased by 100. The stop valve device 136 differs from the stop valve device 36 described hereinabove in the first instance in that the support part 170 is now guided in a tubular projection 164e formed on the bottom end of the armature 164. The advantage of this is that the magnetic field of the coil 168 passing through the armature 164 is disturbed to a lesser extent by ferritic parts, such as, e.g., the disc spring 174. Secondly, the disc spring 174 in the embodiment shown in FIG. 7 lies removably on a support shoulder 170g of the support part 170, which affords the advantage of smaller material stresses. Otherwise, in its construction, the stop valve device 136 corresponds to that in FIGS. 3–6, as does also its functioning. In FIG. 8 a representation is given of a further embodiment of the stop valve device. Similar parts are denoted by the same reference numbers as in FIGS. 3 to 6, but with the addition of 200. The embodiment according to FIG. 8 will be described hereinbelow only insofar as it differs from the embodiments described hereinabove.

In this embodiment the support part 270 has the function of a control chamber outflow valve body. The control chamber outflow valve body 270, in the closing position shown in FIG. 8, applies with its cone 270d on an annular zone 272b of the additional outflow valve body 272 constituting the control chamber outflow valve seat. The control chamber outflow valve body 270 and the additional outflow valve body 272 constiute together an intermediate body unit 270, 272. A helical pressure spring 290 tensions the control chamber outflow valve body 270 in the direction of a lifting from the control chamber outflow valve seat 272b. The spring 290 is mounted between a downwardly protruding ring flange 270h of the control chamber outflow valve body 270 as shown in FIG. 8, and the bell-shaped main part 272d of the additional outflow valve body 272, and acts at one end on the upper side 272e of the edge flange 272a of the additional outflow valve body 272 and at the other end on on an annular web 270i formed on the control chamber outflow valve body 270. The control chamber outflow valve body 270 is sealingly guided in a tubular projection 264e of the armature 264. As a result of the additional closing force originating from the armature tensioning spring 266, the armature 264 is situated in the closing position of the control chamber outflow valve 270, 272b with a shoulder 264f on the control chamber outflow valve body 270 and holds this against the force of the spring 290 in its closing position. (FIG. 8). The pressure prevailing in the control chamber 280 is passed on, via the channels 264g provided in the annular shoulder 264f of the armature 264 substantially to the entire rear side 270k of the control chamber outflow valve body 270. As the control chamber outflow valve body 270 offers to the pressure P in the control chamber 280 in the region of the space 276 a greater impingement surface than the additional outflow valve body 272 in the region of the space 277, the pressure P in the control chamber 280 exerts onto the intermediate body unit 270, 272 a hydraulic closing force downwardly directed in FIG. 8.

If the magnet winding 268, further to an opening command from the external source of signals, is energized with current and, as a result, the armature 264 is lifted from the control chamber outflow valve body 270, the control chamber outflow valve body 270 continues to remain in its closed position if the pressure P prevailing in the control chamber is greater than a predetermined limit value $P_G$ of the pressure, as the hydraulic closing force exerted by the pressure P on the rear side 270 k of the control chamber outflow valve body 270 is greater than the opening pressure exerted by the spring 290 on the control chamber outflow valve body 270. If the pressure P in the control chamber 280 falls below the limit value $P_G$ as a consequence of the pressure in the central channel 252 becoming lower, the control chamber outflow valve body 270 will be lifted as a consequence of the now predominant spring force of the spring from the control chamber outflow valve seat 272b. Now, damping fluid can flow between the control chamber outflow valve body 270 and the control chamber outflow valve seat 272b through to the compensation chamber 228. As a result, the pressure P acting upon the rear side 270k will collapse to such an extent that the control chamber outflow valve body 270, as a consequence of the force of the spring 290, will be fully lifted from the control chamber outflow valve seat 272b and the hole 270e will be completely cleared. With high flow rates, as a result of the pressure drop occurring at the hole 270e, a force directed towards the opening of the additional outflow valve body 272 will be produced. If this force is greater than the force exerted by the spring 290 on the additional outflow valve body 272, the additional outflow valve 272, 256a will open. The stop valve 256, 254 now operates, in conjunction with the spring 260, as a normal spring-loaded damping valve with pre-opening passage 256d. The force produced by the pressure drop on the hole 270e ,nay possibly be supported by a spring 278 mounted in the space 277.

If the magnet winding 268, as a result of a closure command issued by the external signal source, is no longer energized, the armature 264, by the force of the spring 266, is again set in engagement with the control chamber outflow valve body 270. The spring 290 transmits the force thereby exerted on the control chamber outflow valve body 270 onto the additional outflow valve body 272 and presses this against the additional outflow valve seat 256a on the stop valve plate 256, as a result of which the additional outflow valve 272, 256a is closed. As the force of the spring 266 is greater than the force of the spring 290, the spring 290 is compressed as a result until the control chamber outflow valve body 270 again lies on the control chamber outflow valve seat 272b, as a result of which also the control chamber outflow valve 270, 272b is closed. Now, in the control chamber 280, pressure can build up which impinges the intermediate body unit 270, 272 constituted by the control chamber valve body 270 and additional outflow valve body 272 and, as explained above, exerts on it a downwardly directed pressure as shown in FIG. 8. This force collaborates with the force of the springs 260 and 266 in order to press the stop valve plate 256 again against the valve seat 254 against the dynamic pressure of the damper liquid in the central channel 252, so that the stop valve 256, 254 is again closed.

Figure 9:
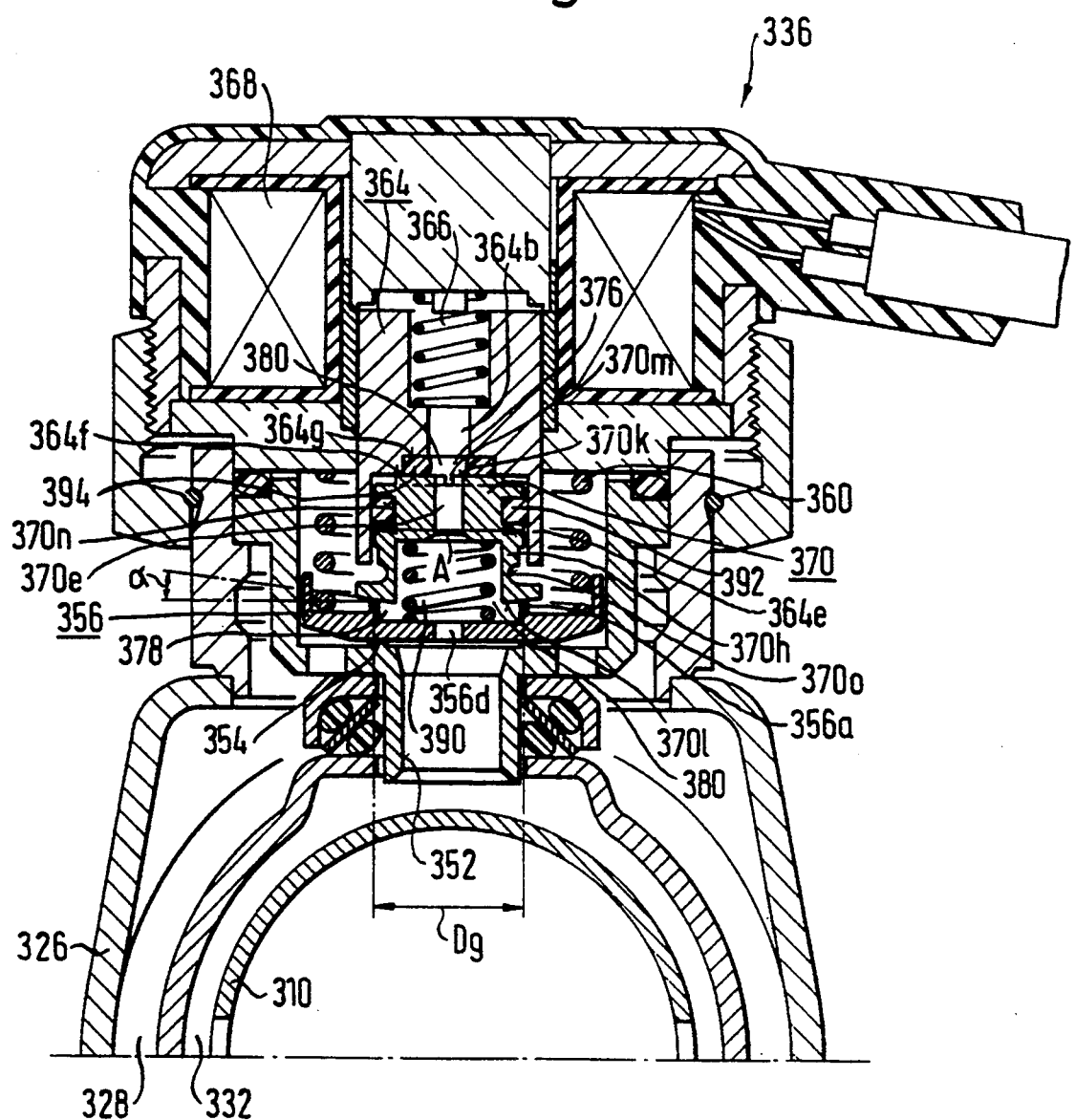

In FIG. 9 a further embodiment of the stop valve device is represented, similar parts being denoted by the same reference numbers as in FIGS. 3 to 6, but with the addition of 300. This embodiment also will hereinafter be described only inasfar as it differs from the embodiment described above.

In the embodiment shown in FIG. 9 the use of an additional outflow valve body is abandoned. The annular rib 356a formed on the stop valve body 356 forms the control chamber outflow valve seat on which the control chamber outflow valve body 370 rests with the underside 370l of the annular flange 370b. Mounted in the inner space of the annular flange 370h is a spring 390 which tensions the control chamber outflow valve body 370 in the direction of lifting from the control chamber outflow valve seat 356a. In the position shown in FIG. 9, the armature 364, as a result of the additional closing force of the armature tensioning spring 366, lies with a shoulder 364f on the control chamber outflow valve body 370 and holds this, against the force of the spring 390, on the control chamber outflow valve seat 356a, i.e. in the closing position of the control chamber outflow valve 370, 356a. A cross groove 370m formed on the rear 370k of the control chamber outflow valve body 370 ensures that, also when the armature 364 lies on the control chamber outflow valve body 370, substantially the entire rear 370k of the control chamber outflow valve body 370 is impinged by the pressure P prevailing in the control chamber 380. As the control chamber outflow valve body 370 affords to the pressure P in the control chamber 380 in the region of the space 376 a greater impingement surface than in the region of the space 378, the pressure P in the control chamber 380 exerts on the control chamber outflow valve body 370 a hydraulic downwardly directed closing force, as shown in FIG. 9.

If the magnet winding 368 is energized, the armature 364 will be lifted from the control chamber outflow valve body 370 against the force of the spring 366. If the value of the pressure P in the control chamber 380 is greater than the predetermined limit value $P_G$ of the pressure, the control chamber outflow valve 370, 356a continues to remain in its closing position shown in FIG. 9, as the hydraulic closing force exerted by the pressure P in the control chamber 380 onto the control chamber outflow valve body 370 is, in this case, greater than the opening force exerted by the spring 390 onto the control chamber outflow valve body 370. If, as a result of the decreasing of the pressure in the central channel 352, the pressure P in the control chamber 380 falls below the predetermined limit value $P_G$ the control chamber outflow valve body 370 will be lifted from the control chamber outflow valve seat 356a by the now overwhelming opening force of the spring 390. Now, damping liquid can flow through to the compensation chamber 328 between the control chamber outflow valve seat 356a and the control chamber outflow valve body 370. The stop valve 356, 354 operates in conjunction with the springs 360 and 390 as a normal spring-loaded damping valve with pre-opening passage 356d.

If the current flowing through the magnet winding 368 is switched off further to a command given by the external source of signals, the armature 364 will be again brought into engagement with the control chamber outflow valve body 370 and will press this against the force of the spring 390 against the control chamber outflow valve seat 356a, as a result of which the control chamber outflow valve 370, 356a closes. As a consequence, in the control chamber 380, pressure builds up which impinges the control chamber outflow valve body 370 and exerts upon this, as was explained hereinabove, a downwardly directed force, as shown in FIG. 9. This force cooperates with the force of the springs 360 and 366, in order to press the stop valve plate 356 against the dynamic pressure of the damping liquid in the central channel 352 again against the valve seat 354, so that the stop valve 356, 354 is again closed.

In order also with the embodiment of FIG. 9 to be able to ensure a compensation for any alignment errors present, the control chamber outflow valve body 370 is guided able to tumble in the tubular projection 364e of the armature 364. For the purpose it is necessary that the outer diameter A of the control chamber outflow valve body 370 should be clearly smaller than the inside diameter of the pipe projection 364e of the armature 364. However, so that a sealtight guiding may be ensured, i.e. so that no damping fluid may escape between tube socket 364e and the outer circumference of the control chamber outflow valve body 370 from the control chamber 380, a sealing element 392 is mounted in an annular groove 370n provided on the outer circumference of the control chamber outflow valve body 370. An annular element 394 mounted in a recess 364g of the armature 364 and formed in an elastic material provides that, also when there are slight tiltings of the control chamber outflow valve body 370 relative to the armature 364, the additional closing force may be reliably transmitted from the armature 364 onto the control chamber outflow valve body 370. In order to ensure the sealtightness of the control chamber outflow valve 370, 356a also when tilting of the control chamber outflow valve body 370 occur, the underside 370l of the annular flange 370h of the control chamber outflow valve body 370 is designed slightly conical. The angle α of the cone may have a value of e.g. 8°. An annular recess 370° semi-circular in cross-section, which is formed in the annular flange 370h of the control chamber outflow valve body 370, improves the elasticity of the ring flange 370h.

Figure 10:
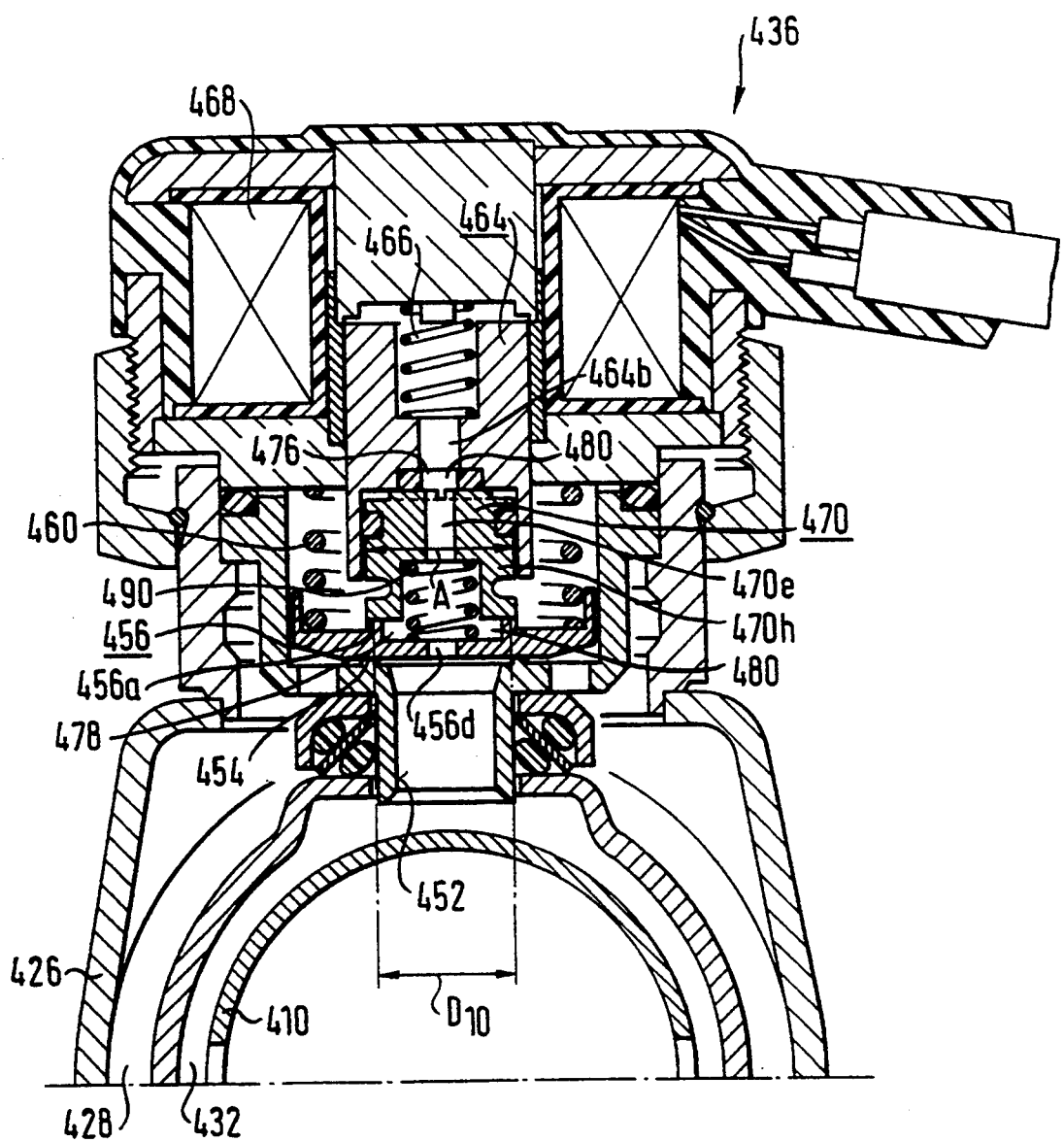

In FIG. 10 a description is given of a further embodiment of the stop valve device, wherein similar parts are provided with the same reference figures as in FIGS. 3 to 6, but increased by 400. The embodiment according to FIG. 10 corresponds substantially to the embodiment shown in FIG. 9, and will therefore be described hereinunder only as far as it differs from this.

In the embodiment shown in FIG. 10, the control chamber outflow valve seat 456a formed on the stop valve body 456 has a diameter $D_{10}$ which is smaller than the diameter $D_9$ of the control chamber outflow valve seat 356a of the embodiment shown in FIG. 9. In the two embodiments mentioned the control chamber outflow valve body 370 or 470 has in each instance the same outer diameter A, so tat in the embodiment of FIG. 10 the ratio of the force exerted by the pressure in the control chamber 480 on the control chamber outflow valve body 470 and directed towards the closing position of the control chamber outflow valve 470, 456a to the force exerted by the pressure in the control chamber 480 onto the control chamber outflow valve body 470 and directed towards the opening position of the control chamber outflow valve 470, 456 is clearly greater than the ratio of the corresponding hydraulic forces exerted onto the control chamber outflow valve body 370 in the embodiment according to FIG. 9. As a consequence of the dimensioning modified relative to FIG. 9, it is thus effected that the control chamber outflow valve 470, 456a opens already when the pressures in the central channel are still low. In addition, the annular flange 470h of the control chamber outflow valve body 470 has a greater wall thickness than the annular flange 370h of the embodiment of FIG. 9.

Figure 11:
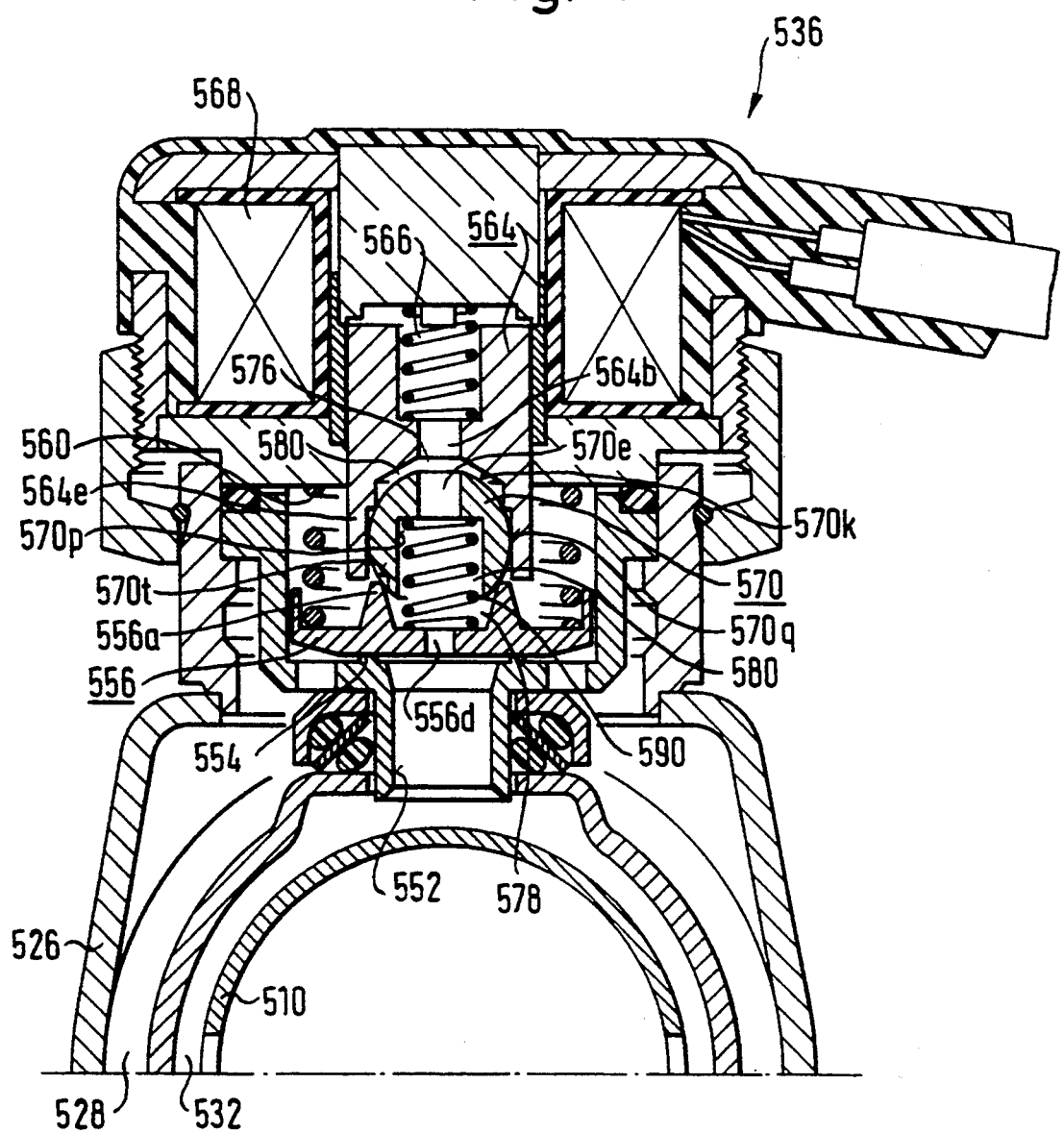

In FIG. 11 a representation is given of a further embodiment of the stop valve device. Similar parts are denoted by the same reference figures as in FIGS. 3 to 6, but increased by 500. This example of embodiment is described below only in as far as it differs in construction and function from the embodiments described hereinabove.

In the embodiment according to FIG. 11 the control chamber outflow valve body 570 is of spherical shape with a spring chamber 570p in which the spring 590 is guided, and a hole 570e leading to the rear 570k of the control chamber outflow valve body 570. The control chamber outflow valve seat is, in the embodiment shown in FIG. 11, formed by an annular rib 556a of trapezoidal shape in cross-section and mounted on the stop valve body 556, which rib, in the closed position of the control chamber outflow valve 570, 556a applies on the control chamber outflow valve body 570 in an annular line. By means of a flat surface provided on the ball 570, shown diagrammatically and in exaggerated fashion at 570t in the left half of FIG. 11, the control chamber outflow valve 570, 556a may also be provided with a surface seal. The control chamber outflow valve body 570 is sealingly guided in the pipe socket 564e of the armature 564 in the region of an annular line 570q.

Figure 12:
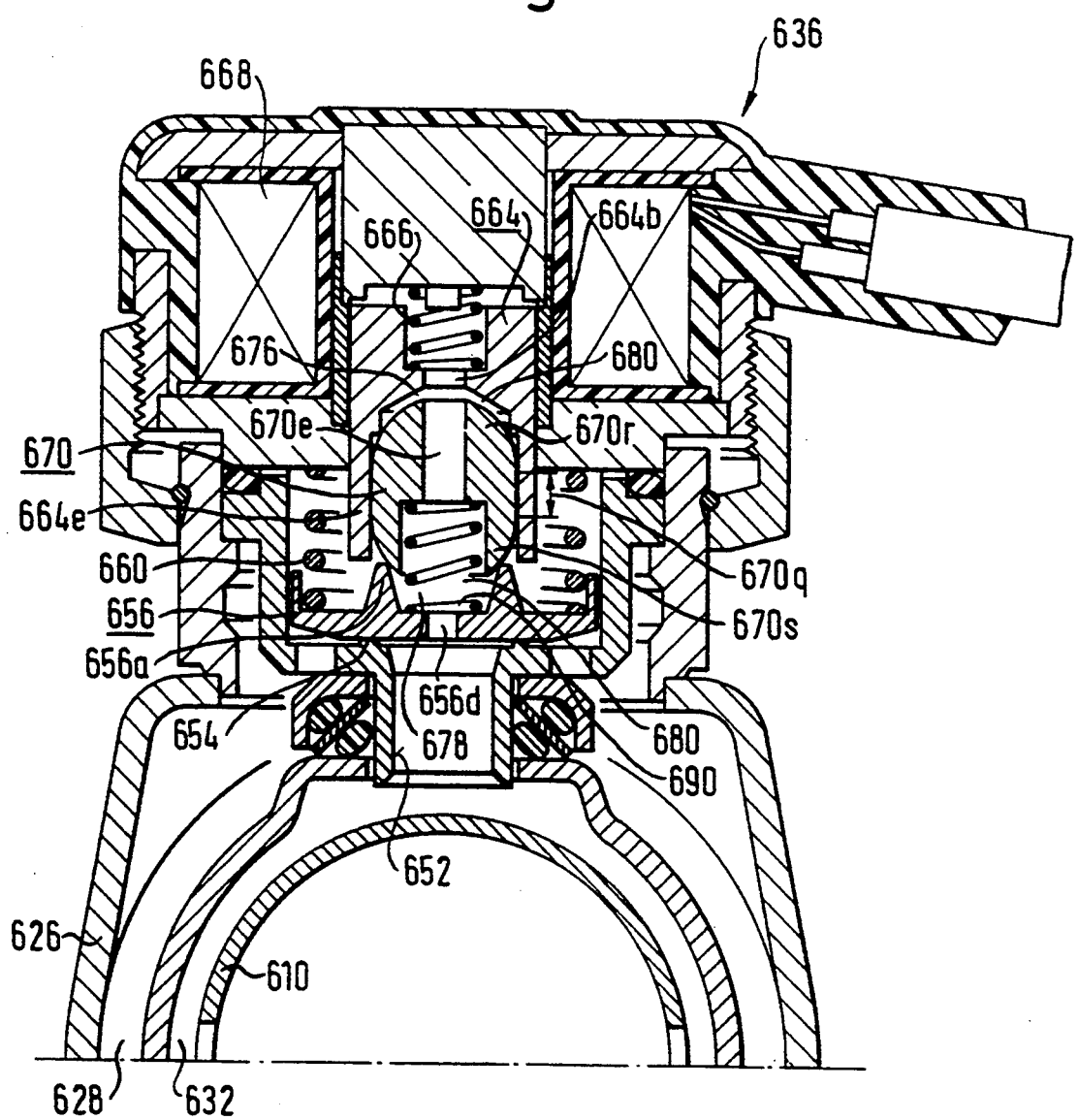

In FIG. 12 a further embodiment of the stop valve device is shown, in which similar parts are given the same reference figures as in FIGS. 3 to 6, but increased by 600.

The embodiment represented in FIG. 12 differs from the example shown in FIG. 11 simply in that the control chamber outflow valve body 670 is cylindrical in shape with ball caps 670r and 670s provided at the ends of the cylinder. With the aid of these the control chamber outflow valve body 670 is sealingly guided in the pipe socket 664e of the armature 664 in the region of the annular surface 670q. In this embodiment there is a certain independence of the quality of the control chamber outflow valve 670, 656a from errors of alignment of the armature 664 and of the outflow valve body 656 as a result of the spherical shaping of the lower end 670s of the control chamber outflow valve body 670.

To conclude, further comments are submitted on essential differences between the stop valve device diagrammatically shown in FIG. 2 and the examples of embodiment shown in FIGS. 3 to 12. Firstly, the stop valve device of FIG. 2 has a stop valve 38 and a spring loaded damper valve 40 mounted in series with it, while the stop valve 56, 54 shown in FIGS. 3 to 12, in conjunction with the pressure spring 60, also performs the function of a spring loaded valve. Furthermore, in the stop valve device shown in FIG. 2, the armature 44a is at all times firmly connected with the piston 38a of the stop valve 38 and the piston 48a of the hydraulic device 48, whereas the armature 64 or 164 in the examples of embodiments of FIGS. 3 to 12 acts, in the closed position shown in FIG. 3 or FIGS. 7 to 12, only onto the control chamber outflow valve body and onto the stop valve body. However, for both forms of embodiment, it is the case that the stop valve body, as a result of the energizing of the magnet coil, is brought in each instance only into an opening preparation position, and that the actual opening does not take place till the pressure in the high pressure part section has fallen under a predetermined value $P_G$, so that no jerking opening of the stop valve can take place, with its attendant creation of noise.

Figure 13:
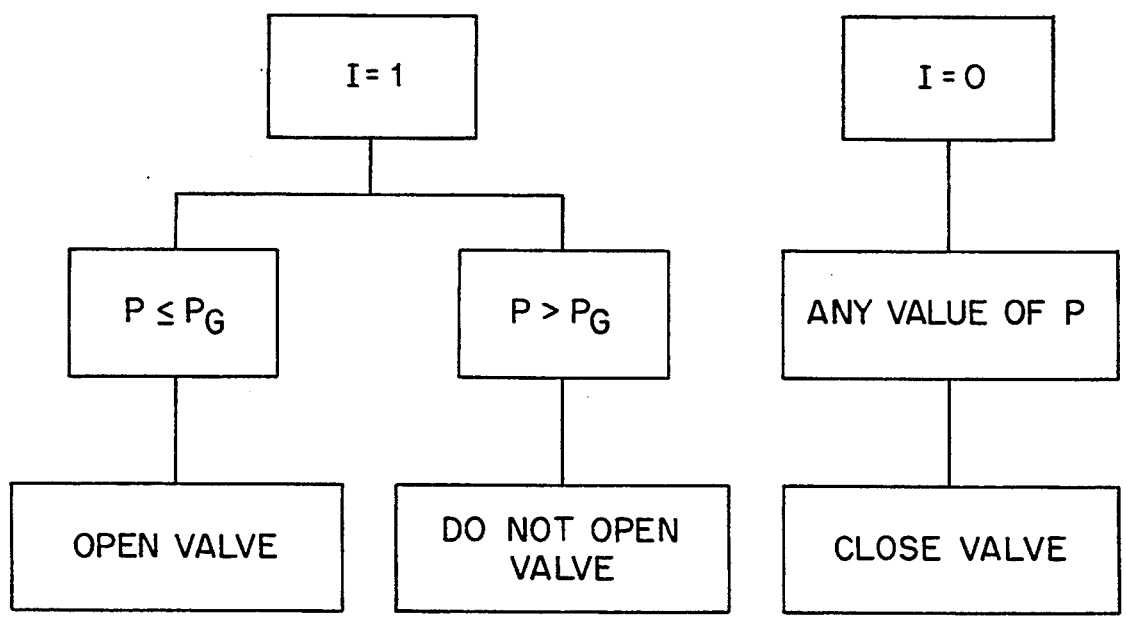
FIG. 13 is a diagram illustrating the basic behavior of the stop valve device.

This basic behavior may be described with reference to FIG. 13 as follows:

The stop valve can open only when, simultaneously, (i) an external control signal I=1 is present, e.g., upon energizing of a magnet coil, and (ii) the actual pressure P in the high pressure part section 32 does not exceed the limit pressure $P_G$ at which the stop valve is to open. Thus, even if an external control signal I=1 is present, the stop valve is not opened when the actual pressure P in the high pressure section 32 exceeds the limit pressure $P_G$. In the absence of a control signal, i.e., with I=0 as the magnet coil is not energized, the stop valve is closed without regard to the pressure value P. The actual pressure in the high pressure part section may range, for example, from 0 to 100 bars. The limit pressure may be established, for example, through the corresponding setting of the stop valve device at 1 bar.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A valve device between two part sections of a fluid connection passage connecting two fluid chambers of a vibration damper, comprising:

a main passage extending between a high pressure part section and a low pressure part section of said fluid connection passage;

a main passage valve body allocated to said main passage and being transferable between a closing position, in which said main passage is substantially closed, and at least one opening position, in which said main passage is at least partially open and interconnects said high pressure part section and said low pressure part section;

said main passage valve body having a first side exposed to fluid pressure in said high pressure part section and a second side exposed to fluid pressure within a control chamber;

said main passage valve body being further subject to first elastic force generating means, said first elastic force generating means and said fluid pressure within said control chamber acting onto said main passage valve body in a closing sense against the action of said fluid pressure within said high pressure part section;

said control chamber being connected with said high pressure part section through a throttling passage across said main passage valve body and being connected with said low pressure part section through control chamber outflow valve means;

a closing load providing means for loading said control chamber outflow valve means towards a closing condition with a variable closing load, said closing load providing means being adjustable as to the magnitude of the closing load by external control means;

said control chamber outflow valve means being further loadable in a closing condition maintaining direction by a fluid pressure within said control chamber which corresponds substantially to the pressure within said high pressure part section when said control chamber outflow valve means are in said closing condition in response to a predetermined magnitude of said closing load;

said main passage valve body being maintained in said closing position when said fluid pressure in said control chamber substantially corresponds to said fluid pressure in said high pressure part section;

said fluid pressure within said control chamber being reducible in response to a transition of said control chamber outflow valve means towards an opening condition;

said main passage valve body being ready for transition to said at least one opening position in response to reduction of pressure in said control chamber and being, when ready for transition, transferable to said at least one opening position in response to fluid supply from said high pressure part section;

said control chamber outflow valve means being settable in an outflow preparation state by reduction of said closing load below a further predetermined magnitude, said control chamber outflow valve means remaining in said substantially closed condition after having been set in said outflow preparation status until the pressure in said high pressure part section has fallen below a predetermined pressure value ($P_G$).

2. The valve device according to claim 1, said main passage valve body cooperating with a main passage valve seat, said control chamber outflow valve means having a control chamber outflow valve seat and a control chamber outflow valve body which is biased by second elastic force generating means toward an outflow position in which said control chamber outflow valve body is lifted off said control chamber outflow valve seat.

3. The valve device according to claim 2, characterized in that an armature of said external control means acts upon the control chamber outflow valve body and transmits the closing load to the control chamber outflow valve body.

4. The valve device according to claim 3, characterized in that the armature is loaded by an armature tensioning spring to produce the closing load, and in that, to remove the closing load, a magnet coil of the armature can be energized.

5. The valve device according to claim 3, characterized in that the control chamber outflow valve body is constituted by a disc spring which is tensioned by inner tension in the direction of the opening of the control chamber outflow valve means, and is exposed to the pressure prevailing in the control chamber and to the action of the armature.

6. The valve device according to claim 5, characterized in that the disc spring lies with a first circumferential edge on a supporting shoulder of an intermediate body unit or is mounted thereon, and with a second circumferential edge can be pressed against the outflow valve seat.

7. The valve device according to claim 2, characterized in that the control chamber outflow valve body is mounted on an intermediate body unit which, by means of the pressure in the control chamber, can be sealingly pressed against the main passage valve body, and when the pressure decreases in the control chamber, can be lifted from the main passage valve body for forming additional control chamber outflow valve means of the control chamber.

8. The valve device according to claim 7, characterized in that the intermediate body unit is sealingly guided in one of a part of a main passage valve housing and a part of an armature of said external control means.

9. The valve device according to claim 7, characterized in that the intermediate body unit is formed of a support part supporting the control chamber outflow valve body and of an additional outflow valve body in ball-jointed engagement with the support part which, together with an additional outflow valve seat formed on the main passage valve body, constitutes the additional control chamber outflow valve means of the control chamber.

10. The valve device according to claim 2, characterized in that the control chamber outflow valve seat is formed on an additional control chamber outflow valve body which, together with an additional control chamber outflow valve seat formed on the main passage valve body, constitutes additional control chamber outflow valve means of the control chamber, and in that between the control chamber outflow valve body and the additional control chamber outflow valve body, a helical pressure spring is arranged which tensions the control chamber outflow valve body in the direction of lifting it from the control chamber outflow valve seat provided on the additional control chamber outflow valve body.

11. The valve device according to claim 10, characterized in that the control chamber outflow valve body is guided in a valve body guide of one of a main passage valve housing and an armature of said external control means, in sealed manner, and in that the control chamber outflow valve body and the additional control chamber outflow valve body apply against each other in ball-joined manner in the region of the control chamber outflow valve seat.

12. The valve device according to claim 2, characterized in that the control chamber outflow valve seat is formed on the main passage valve body, and in that, between the control chamber outflow valve body and the main passage valve body, provision is made for a helical pressure spring which tensions the control chamber outflow valve body in the direction of lifting it from the control chamber outflow valve seat provided on the main passage valve body.

13. The valve device according to claim 12, characterized in that the control chamber outflow valve body is sealingly guided, able to tumble or in ball-joined manner, in a valve body guide of one of a main passage valve housing and an armature of said external control means.

14. The valve device according to claim 12, characterized in that the control chamber outflow valve body is spherical at least in the region of the control chamber outflow valve seat.

15. A valve device between two part sections of a fluid connection passage connecting two fluid chambers of a vibration damper, comprising:
a main passage extending between a high pressure part section and a low pressure part section of said fluid connection passage;
main passage valve means with a main passage valve body allocated to said main passage and being transferable from a hard damping position towards milder damping positions in which said main passage interconnects said high pressure part section and said low pressure part section with increasing flow cross-sectional area;
said main passage valve body having a first side exposed to fluid pressure in said high pressure part section and a second side exposed to fluid pressure within a control chamber;
said main passage valve body being further subject to first elastic force generating means, said first elastic force generating means and said fluid pressure within said control chamber acting onto said main passage valve body in a flow cross-sectional area reducing sense against the action of said fluid pressure within said high pressure part section;
said control chamber being connected with said high pressure part section through a throttling passage across said main passage valve means and being connected with said low pressure part section through control chamber outflow valve means;
a closing load providing means for loading said control chamber outflow valve means towards a condition of maximum outflow restriction with a variable closing load, said closing load providing means being adjustable as to the magnitude of the closing load by external control means;
said control chamber outflow valve means being further loadable in an outflow restricting sense by a fluid pressure within said control chamber which is approached to a maximum degree to the pressure within said high pressure part section when said control chamber outflow valve means is in said condition of maximum outflow restriction in response to a predetermined magnitude of said closing load;

said main passage valve body being maintained in said hard damping position when said fluid pressure in said control chamber is approached to said maximum degree to said fluid pressure in said high pressure part section;

said fluid pressure within said control chamber being subject to a reduction in response to a transition of said control chamber outflow valve means towards a condition of minor outflow restriction;

said main passage valve body being ready for transition toward said milder damping positions in response to said reduction of pressure in said control chamber and being, when ready for transition, transferable toward said milder damping positions in response to fluid supply from said high pressure part section;

said control chamber outflow valve means being settable in a minor-outflow-restriction-preparation state by a reduction of said closing load through said external control means below said predetermined magnitude, said control chamber outflow valve means remaining in said condition of maximum outflow restriction after having been set in said minor-outflow-restriction preparation state until the pressure in said high pressure part section has fallen below a predetermined pressure value ($P_G$).

16. The valve device according to claim 15, said main passage valve body cooperating with a main passage valve base, said control chamber outflow valve means having a control chamber outflow valve base and a control chamber outflow valve body which is biased by second elastic force generating means toward a position of minor outflow restriction corresponding to said condition of minor outflow restriction.

17. The valve device according to claim 16, characterized in that an armature of said external control means acts upon said control chamber outflow valve body and transmits said closing load to the control chamber outflow valve body.

18. The valve device according to claim 17, characterized in that the armature is loaded by an armature tensioning spring to produce the closing load, and in that, to remove the closing load, a magnet coil of the armature can be energized.

19. The valve device according to claim 17, characterized in that the control chamber outflow valve body is constituted by a disc spring which is tensioned by inner tension toward said position of minor outflow restriction, said disc spring being exposed to the pressure prevailing in the control chamber and to the action of the armature.

20. The valve device according to claim 19, characterized in that the disc spring lies with a first circumferential edge on a supporting shoulder of an intermediate body unit or is mounted thereon, and with a second circumferential edge can be pressed against an outflow valve seat forming said outflow valve base.

21. The valve device according to claim 16, characterized in that said control chamber outflow valve body is mounted on an intermediate body unit which, by means of the pressure in the control chamber, can be sealingly pressed against the main passage valve body, and when said pressure reduction occurs in said control chamber, can be lifted from the main passage valve body so as to establish additional control chamber outflow valve means of the control chamber.

22. The valve device according to claim 21, characterized in that the intermediate body unit is sealingly guided in one of a part of a main passage valve housing and a part of an armature of said external control means.

23. The valve device according to claim 21, characterized in that the intermediate body unit comprises a support part supporting the control chamber outflow valve body and an additional outflow valve body in ball-jointed engagement with the support part which, together with an additional outflow valve base formed on the main passage valve body, constitutes the additional control chamber outflow valve means of the control chamber.

24. The valve device according to claim 16, characterized in that the control chamber outflow valve base is formed on an additional control chamber outflow valve body which, together with an additional control chamber outflow valve base formed on the main passage valve body, constitutes additional control chamber outflow valve means of the control chamber, and in that between the control chamber outflow valve body and the additional control chamber outflow valve body, a helical pressure spring is arranged which tensions the control chamber outflow valve body in the direction of lifting it from the control chamber outflow valve base provided on the additional control chamber outflow valve body.

25. The valve device according to claim 24, characterized in that the control chamber outflow valve body is guided in a valve body guide of one of a main passage valve housing and an armature of said external control means, in sealed manner, and in that the control chamber outflow valve body and the additional control chamber outflow valve body apply against each other in ball-joined manner in the region of the control chamber outflow valve base.

26. The valve device according to claim 16, characterized in that the control chamber outflow valve base is formed on the main passage valve body, and in that, between the control chamber outflow valve body and the main passage valve body, provision is made for a helical pressure spring which tensions the control chamber outflow valve body in the direction of lifting it from the control chamber outflow valve base provided on the main passage valve body.

27. The valve device according to claim 26, characterized in that the control chamber outflow valve body is sealingly guided, able to tumble or in ball-joined manner, in a valve body guide of one of a main passage valve housing and an armature of said external control means.

28. The valve device according to claim 26, characterized in that the control chamber outflow valve body is spherical at least in the region of the control chamber outflow valve base.

* * * * *